(12) United States Patent
Honda

(10) Patent No.: US 9,260,137 B2
(45) Date of Patent: Feb. 16, 2016

(54) VEHICLE FRAME STRUCTURE

(71) Applicant: MAZDA MOTOR CORPORATION, Hiroshima (JP)

(72) Inventor: Masanori Honda, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/390,874

(22) PCT Filed: Mar. 11, 2013

(86) PCT No.: PCT/JP2013/001567
§ 371 (c)(1),
(2) Date: Oct. 6, 2014

(87) PCT Pub. No.: WO2013/168331
PCT Pub. Date: Nov. 14, 2013

(65) Prior Publication Data
US 2015/0115654 A1    Apr. 30, 2015

(30) Foreign Application Priority Data

May 8, 2012    (JP) .................................. 2012-106603

(51) Int. Cl.
*B60N 99/00*    (2006.01)
*B62D 25/04*    (2006.01)
*B62D 29/00*    (2006.01)

(52) U.S. Cl.
CPC ............. *B62D 25/04* (2013.01); *B62D 29/002* (2013.01)

(58) Field of Classification Search
CPC ............................. B62D 25/04; B62D 29/002
See application file for complete search history.

(56) References Cited

U.S. PATENT DOCUMENTS

| 5,938,275 | A | 8/1999 | Kleinhans et al. | |
| 6,702,368 | B1 | 3/2004 | Hanyu | |
| 7,976,098 | B2 * | 7/2011 | Nishimura et al. | 296/193.06 |
| 8,235,458 | B2 | 8/2012 | Mori | |
| 2008/0143144 | A1 * | 6/2008 | Yustick et al. | 296/187.03 |
| 2010/0194146 | A1 | 8/2010 | Nishimura et al. | |
| 2011/0095567 | A1 | 4/2011 | Ishigame et al. | |
| 2011/0210581 | A1 | 9/2011 | Kunishi et al. | |

FOREIGN PATENT DOCUMENTS

| CN | 102202959 A | 9/2011 |
| JP | 2003-081132 A | 3/2003 |
| JP | 2003-205859 A | 7/2003 |

(Continued)

OTHER PUBLICATIONS

International Search Report; PCT/JP2013/001567; Jun. 11, 2013.

*Primary Examiner* — Lori L Lyjak
(74) *Attorney, Agent, or Firm* — Studebaker & Brackett PC

(57) ABSTRACT

A frame body (1) includes a first surface (11), a second surface (12), and two side surfaces (13). Each of the side surfaces (13) has a single bent part or two or more bent parts (14). The first surface (11) and an outer part (13a) of each of the side surfaces (13) form an angle of approximately 90 degrees or larger than 90 degrees inside the closed cross-section in the cross-section of the frame body (1). At least one of the side surfaces (13) includes a low-strength part (17) closer to the second surface (12) and a high-strength part (18) closer to the first surface (11), and includes a strength transition part (19) located closer to the second surface (12) than a specific bent part (the bent part (14) which is closest to the second surface (12) and protrudes inward of a closed cross-section).

4 Claims, 13 Drawing Sheets

(56) References Cited

FOREIGN PATENT DOCUMENTS

| | | |
|---|---|---|
| JP | 2004-130826 A | 4/2004 |
| JP | 2005-178695 A | 7/2005 |
| JP | 2009-286351 A | 12/2009 |
| JP | 2010-173562 A | 8/2010 |
| JP | 2011-088596 A | 5/2011 |
| JP | 2011-251659 A | 12/2011 |

* cited by examiner

FIG.6

| M | −1.01 | 0 | 0.21 | 0.41 | 0.80 | 1.00 | 1.51 |
|---|---|---|---|---|---|---|---|
| CLOSED CROSS-SECTION | | | | | | | |
| RATE OF IMPROVEMENT IN Fmax MASS EFFICIENCY | −14% | 0% | 4% | 9% | 20% | 23% | 10% |

FIG.8

| h/H | 0.42 | 0.49 | 0.55 | 0.62 | 0.69 | 0.75 | 0.82 | 0.89 | 1.00 |
|---|---|---|---|---|---|---|---|---|---|
| CLOSED CROSS-SECTION | | | | | | | | | |
| RATE OF IMPROVEMENT IN Fmax MASS EFFICIENCY | 8% | 10% | 12% | 18% | 23% | 23% | 22% | 12% | 0% |

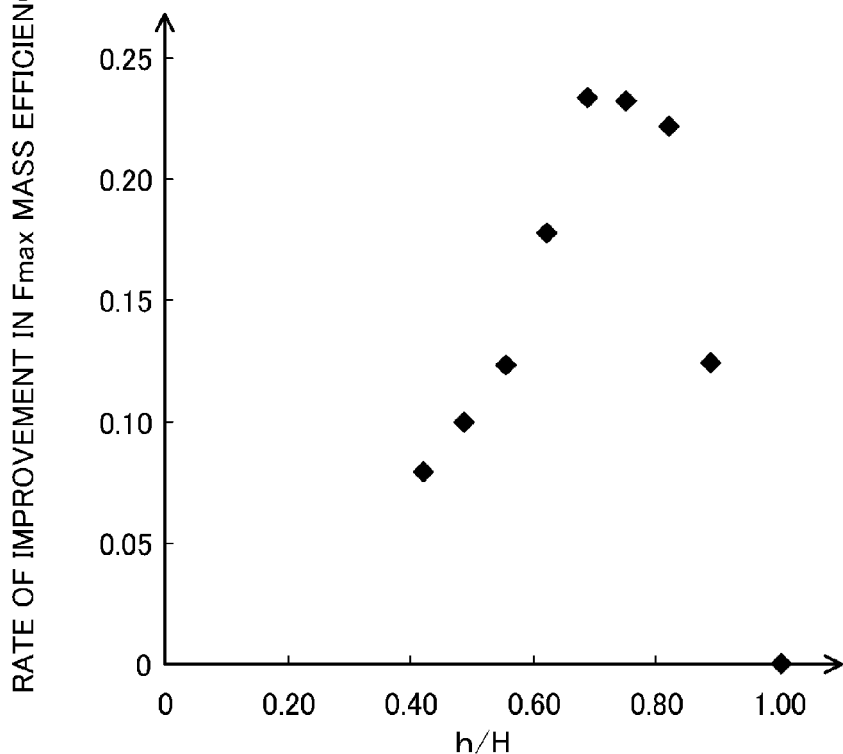

FIG.14

| BENT PART | | UPPER | LOWER | TEST FRAME BODY D | TEST FRAME BODY E | TEST FRAME BODY F |
|---|---|---|---|---|---|---|
| | | | | PROTRUDE INWARD | PROTRUDE OUTWARD | PROTRUDE INWARD |
| | | | | PROTRUDE INWARD | PROTRUDE INWARD | PROTRUDE OUTWARD |
| M | | UPPER | | 1.0 | 0.25 | 0 |
| | | LOWER | | 0.56 | 0.52 | -1.0 |
| h/H | | UPPER | | 0.63 | 0.75 | 0.78 |
| | | LOWER | | 0.57 | 0.63 | 0.72 |
| CLOSED CROSS-SECTION | | | | | | |
| RATE OF IMPROVEMENT IN Fmax MASS EFFICIENCY | | | | 20% | 24% | 0% |

VEHICLE FRAME STRUCTURE

TECHNICAL FIELD

The present disclosure relates to a vehicle frame structure having a frame body constituting a vehicle body.

BACKGROUND ART

Improved flexural strength has been required for a frame body used particularly for a center pillar of a vehicle body of a vehicle in view of side impact performance of the vehicle. To improve the flexural strength, for example, Patent Document 1 teaches a center pillar including an outer panel positioned outside the vehicle body, an inner panel positioned inside the vehicle body to form a closed cross-section with the outer panel, and a reinforcement arranged between the outer panel and the inner panel.

Patent Document 2 teaches that an outer wall positioned outside the vehicle body is made thicker than a front wall and a rear wall, and a thickness increasing part which is gradually increasing in thickness toward the outside of the vehicle body from a substantial center of the vehicle in a width direction of the vehicle is formed inside the front wall and the rear wall.

CITATION LIST

Patent Documents

Patent Document 1: Japanese Unexamined Patent Publication No. 2003-081132
Patent Document 2: Japanese Unexamined Patent Publication No. 2003-205859

SUMMARY OF THE INVENTION

Technical Problem

The structure of Patent Document 2 is basically obtained by casting, and cannot easily be applied to a method of manufacturing the panel by press-forming a steel plate, etc. In addition, the structure needs to be thick, which increases the weight of the vehicle body.

The structure of Patent Document 1 allows manufacturing of the panel by press-forming at low cost, but is susceptible to improvement in view of weight reduction and improvement in flexural strength of the frame body.

In view of the foregoing, the present disclosure has been achieved. An object of the present disclosure is to provide a lightweight and simple vehicle frame structure which can easily be manufactured by press-forming, and has high strength against flexure of a frame body caused by an externally applied load.

Solution to the Problem

To achieve the object, the present disclosure is directed to a vehicle frame structure including a frame body constituting a vehicle body. The frame body includes a first surface facing outside of the vehicle body, a second surface which is positioned inside the first surface to oppose the first surface and is wider than the first surface, and two side surfaces, one of which connecting one of ends of the first surface in a width direction of the first surface and one of ends of the second surface in a width direction of the second surface, the other connecting the other end of the first surface and the other end of the second surface to form a closed cross-section together with the first surface and the second surface, each of the side surfaces has a single bent part or two or more bent parts which are bent at a midpoint of the first surface and the second surface in a cross-section of the frame body, the first surface and an outer part of the side surface which is positioned closer to the first surface than the single bent part, or is positioned closer to the first surface than one of the bent parts closest to the first surface form an angle of approximately 90 degrees or larger than 90 degrees inside the closed cross-section in the cross-section of the frame body, a specific bent part which is the single bent part, or one of the bent parts closest to the second surface is bent to protrude inward of the closed cross-section, at least one of the side surfaces includes a low-strength part closer to the second surface and a high-strength part closer to the first surface, and a strength transition part as a boundary between the low-strength part and the high-strength part of the at least one of the side surfaces is located closer to the second surface than the specific bent part.

When an externally applied load is exerted on a middle part of the first surface in a longitudinal direction of the frame body (an impact load is exerted to bend the frame body so that a middle part of the frame body in the longitudinal direction protrudes inward of the vehicle body relative to the ends of the frame body in the longitudinal direction), a force is exerted in a direction outward of the closed cross-section on an end of the side surface closer to the first surface around the part on which the externally applied load is exerted or a portion near the end, and the end or the portion may locally be buckled by the force. However, with the specific bent part protruding inward of the closed cross-section, a force is exerted in a direction inward of the closed cross-section on the specific bent part to cancel the force in the direction outward of the closed cross-section. Thus, even when a large externally applied load is exerted on the first surface, the local buckling does not easily occur at the end of the side surface closer to the first surface around the part on which the externally applied load is exerted. Further, when the angle formed by the first surface and the outer part of the side surface inside the closed cross-section is approximately 90 degrees or larger than 90 degrees, the first surface and the side surfaces can easily be formed in one-piece by press-forming, and the flexural strength of the frame body is improved as compared with the case where the bent parts are not formed. The range of approximately 90 degrees includes 90 degrees, and includes a normal margin of error from 90 degrees due to the press-forming.

Further, since only the part of the side surface which is closer to the first surface and includes the specific bent part is formed as the high-strength part, the occurrence of the local buckling can effectively be reduced, and part of the side surface closer to the second surface can be reduced in weight. Thus, the frame body can be reduced in weight, and the flexural strength of the frame body can be improved.

In the above-described vehicle frame structure, the specific bent part is preferably located closer to the first surface than a center of gravity of the cross-section of the frame body in a direction perpendicular to the first surface, and the strength transition part is preferably located closer to the second surface than the center of gravity in the direction perpendicular to the first surface.

With the specific bent part located closer to the first surface than the center of gravity of the cross-section of the frame body in the direction perpendicular to the first surface, the force in the direction outward of the closed cross-section can favorably be canceled when the externally applied load is exerted on the first surface. That is, when the externally applied load is exerted on the first surface, a compressive force is applied to part of the frame body closer to the first surface than the center of gravity, and a tensile force is applied to part of the frame body closer to the second surface than the center of gravity. Since the force in the direction outward of the closed cross-section is exerted on the part to which the compressive force is applied, the specific bent part for canceling the force is preferably located in the part to which the compressive force is applied. Thus, the force in the outward direction of the closed cross-section can favorably be canceled by locating the specific bent part at a position where the compressive force is applied, i.e., located closer to the first surface than the center of gravity. With the strength transition part located closer to the second surface than the center of gravity in the direction perpendicular to the first surface, the part to which the compressive force is applied can entirely be increased in strength so that the local buckling can effectively be reduced. Further, the first surface approaches the second surface immediately before the local buckling occurs, and the position of the center of gravity slightly moves immediately before the local buckling occurs toward the second surface from the initial position before the load is applied. Even if the center of gravity is moved in this way, the part to which the compressive force is applied can entirely be increased in strength by the strength transition part located closer to the second surface than the center of gravity.

When the specific bent part and the strength transition part are located as described above, each of the side surfaces has the single bent part, the first surface and the outer part form an angle of approximately 90 degrees inside the closed cross-section in the cross-section of the frame body, and provided that a distance between the first surface and part of the second surface farthest from the first surface measured along the direction perpendicular to the first surface is Ha, a distance between the specific bent part and the part of the second surface farthest from the first surface measured along the direction perpendicular to the first surface is ha, and a distance between the strength transition part and the part of the second surface farthest from the first surface measured along the direction perpendicular to the first surface is Aa in the cross-section of the frame body, $0.55 \leq ha/Ha \leq 0.90$ and $0.40 \leq Aa/ha \leq 0.53$ are preferably satisfied.

Specifically, the flexural strength of the frame body varies depending on the position of the bent part along the direction perpendicular to the first surface. However, when $0.55 \leq ha/Ha \leq 0.90$ is satisfied, the flexural strength of the frame body can favorably be improved. In addition, when the position of the strength transition part is determined to satisfy $0.40 \leq Aa/ha \leq 0.53$, the strength transition part can easily be located closer to the second surface than the center of gravity in the direction perpendicular to the first surface, and the flexural strength of the frame body can favorably be improved.

In the above-described vehicle frame structure, each of the side surfaces has the single bent part, the first surface and the outer part form an angle of approximately 90 degrees inside the closed cross-section in the cross-section of the frame body, and provided that a distance between the first surface and part of the second surface farthest from the first surface measured along a direction perpendicular to the first surface is Ha, a distance between the specific bent part and the part of the second surface farthest from the first surface measured along the direction perpendicular to the first surface is ha, and a distance between the strength transition part and the part of the second surface farthest from the first surface measured along the direction perpendicular to the first surface is Aa in the cross-section of the frame body, $0.55 \leq ha/Ha \leq 0.90$ and $0.40 \leq Aa/ha \leq 0.66$ may be satisfied.

Even in this configuration, the flexural strength of the frame body can favorably be improved.

In the above-described vehicle frame structure, the frame body may constitute a center pillar of the vehicle body, a door mounting bracket may be mounted on the first surface of the frame body facing outside the vehicle body, the door mounting bracket may include a base which is mounted and fixed to the first surface, and a protrusion which protrudes from the base outwardly in a width direction of the vehicle, and has an end to which a door is mounted, the protrusion may extend in the width direction of the vehicle near one of the side surfaces located rearward in a longitudinal direction of the vehicle, and only the one of the two side surfaces of the frame body located rearward in the longitudinal direction of the vehicle may include the low-strength part and the high-strength part, and the strength transition part may be located closer to the second surface than the specific bent part in the side surface located rearward in the longitudinal direction of the vehicle.

When the vehicle frame structure of the present invention is applied to the center pillar, side impact performance of the vehicle can be improved by a lightweight and simple configuration. Further, in the side surface located rearward in the longitudinal direction of the vehicle, part of the side surface which is closer to the first surface and includes the specific bent part is increased in strength, so that the occurrence of the local buckling which easily occurs in the one of the two side surfaces located rearward in the longitudinal direction of the vehicle can favorably be reduced. That is, when the externally applied load is input to the center pillar through the door and the door mounting bracket, the protrusion of the door mounting bracket is bent rearward in the longitudinal direction of the vehicle around the end thereof closer to the base. At this time, the externally applied load is input to part of the first surface located rearward in the longitudinal direction of the vehicle. Thus, the local buckling may easily occur at the one of the two side surfaces located rearward in the longitudinal direction of the vehicle. Therefore, part of the side surface located rearward in the longitudinal direction of the vehicle which is closer to the first surface and includes the specific bent part may be increased in strength. Since the specific bent part is provided on the side surface located forward in the longitudinal direction of the vehicle, the force in the outward direction of the closed cross-section can be canceled solely by the specific bent part, and the occurrence of the local buckling can sufficiently be reduced. As a result, the center pillar can further be reduced in weight.

Advantages of the Invention

As described above, the frame vehicle structure of the present disclosure is lightweight and simple, can easily be manufactured by press-forming, and can improve the strength of the frame body against flexure caused by the externally applied load. Thus, impact performance of the vehicle body can be improved at low cost.

BRIEF DESCRIPTION OF THE DRAWINGS

FIG. 6 is a table showing the shape of a closed cross-section and a rate of improvement in Fmax mass efficiency corresponding to value M.

FIG. 8 is a table showing the shapes of the closed cross-section and the rate of improvement in Fmax mass efficiency corresponding to value h/H.

FIG. 9 is a graph showing a relationship between the value h/H and the rate of improvement in Fmax mass efficiency.

FIG. 10 is a table showing the shape of the closed cross-section and the rate of improvement in Fmax mass efficiency of the test frame bodies A-C.

FIG. 14 is a table showing the shape of the closed cross-section and the rate of improvement in Fmax mass efficiency of test frame bodies D-E.

DESCRIPTION OF EMBODIMENTS

Embodiments of the present disclosure will be described in detail below.

Figure 1:
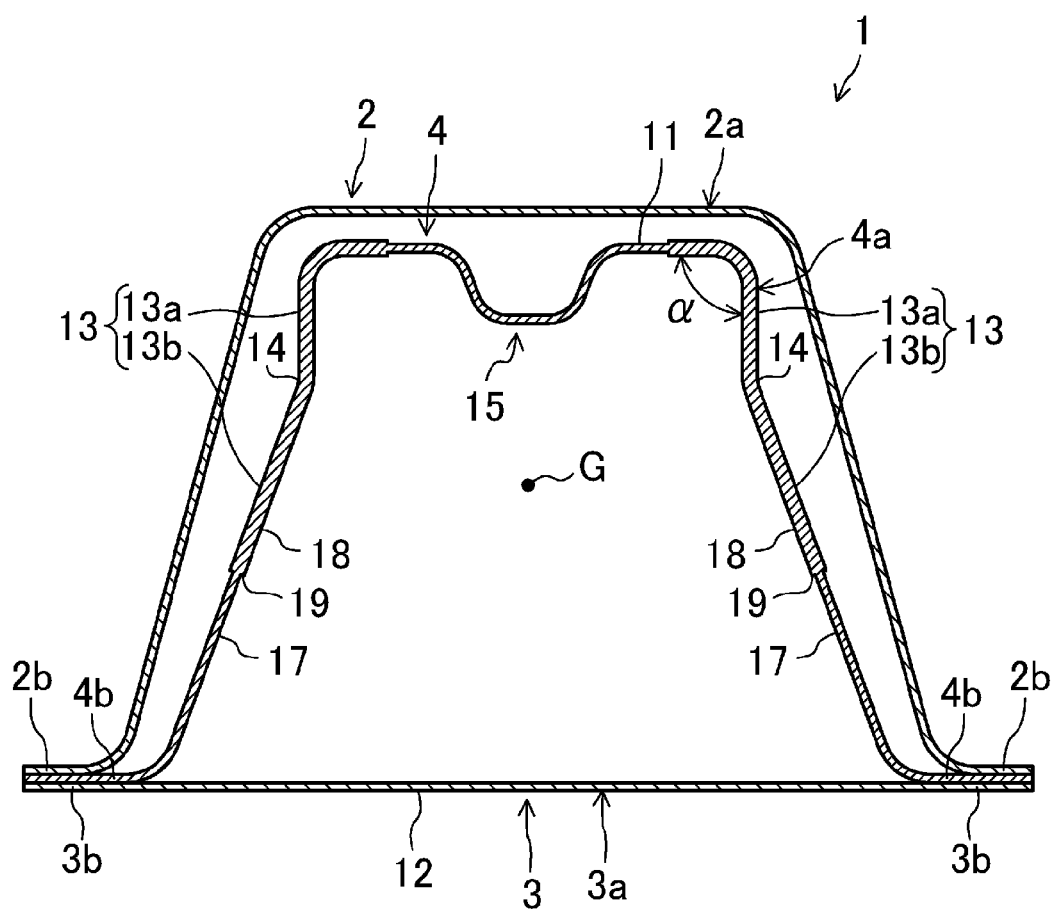
FIG. 1 is a cross-sectional view of a frame body to which a frame vehicle structure of an embodiment of the present disclosure is applied.

FIG. 1 shows a cross-section of a frame body 1 to which the vehicle frame structure of an embodiment of the present disclosure is applied. In this embodiment, the frame body 1 constitutes a center pillar of a vehicle body, and extends in a direction perpendicular to a sheet plane of FIG. 1 (corresponding to a vertical direction of the vehicle when attached to the vehicle body). The vehicle frame structure of the present disclosure may be applied to substantially all part of the center pillar in the vertical direction, or may be applied to part of the center pillar in the vertical direction (e.g., to an upper part of the center pillar to protect particularly an upper body of a passenger, or a lower part of the center pillar to which an impact load tends to be applied upon side impact of the vehicle (particularly a part between upper and lower door mounting brackets (reference numeral 31 in FIG. 15) for mounting a rear door on the center pillar).

The frame body 1 includes an outer panel 2 positioned outside the vehicle body, an inner panel 3 positioned inside the vehicle body, and a reinforcement 4 (may be referred to as an outer reinforcement) arranged between the outer panel 2 and the inner panel 3. The outer panel 2 and the inner panel 3 form a closed cross-section, and the inner panel 3 and the reinforcement 4 form another closed cross-section. The outer panel 2 and the reinforcement 4 form still another closed cross-section.

The outer panel 2 includes a body 2a, and flange parts 2b connected to ends of the body 2a in a width direction of the body 2a (a lateral direction of FIG. 1), respectively. The inner panel 3 includes a body 3a, and flange parts 3b connected to ends of the body 3a in a width direction of the body 3a (a lateral direction of FIG. 1), respectively. The reinforcement 4 includes a body 4a, and flange parts 4b connected to ends of the body 4a in a width direction of the body 4a (a lateral direction of FIG. 1), respectively. The outer panel 2, the inner panel 3, and the reinforcement 4 are individually press-formed, and the frame body 1 is obtained by stacking and joining the flange parts 2b, 3b, and 4b after the press-forming.

In this embodiment, the vehicle frame structure of the present disclosure is applied to the inner panel 3 and the reinforcement 4. The outer panel 2 is fundamentally provided in terms of design, and the body 2a covers an outer side of the reinforcement 4. The reinforcement 4 is preferably made of a high-strength steel plate having a tensile strength of 980 MPa or higher, and a thickness of 1.0 mm to 2.5 mm, both inclusive, and is preferably formed by hot press-forming A low-strength part 17 described later preferably has a thickness of 1.0 mm to 1.5 mm, both inclusive, and a high-strength part 18 described later preferably has a thickness larger than 1.5 mm and not larger than 2.5 mm.

The frame body 1 includes a first surface 11 facing outside the vehicle body, a second surface 12 which is positioned inside the first surface 11 to oppose the first surface 11 and is wider than the first surface 11, and two side surfaces 13, one of which connecting one of the ends of the first surface 11 in a width direction of the first surface 11 and one of the ends of the second surface 12 in a width direction of the second surface 12, and the other connecting the other end of the first surface 11 and the other end of the second surface 12 to form a closed cross-section together with the first surface 11 and the second surface 12. The first surface 11 and the two side surfaces 13 are constituted of the body 4a of the reinforcement 4, and the second surface 12 is constituted of the body 3a of the inner panel 3. The second surface 12 and the side surfaces 13 are connected by joining the flange parts 3b of the inner panel 3 and the flange parts 4b of the reinforcement 4. In this embodiment, the second surface 12 (the body 3a) and the two flange parts 3b are positioned on the same straight line, and the first surface 11 (except for a bead 15 described later) is positioned on another straight line parallel to the straight line in the cross-section of the frame body 1.

A bead 15 is formed on a center part of the first surface 11 in the width direction of the first surface 11 to protrude inward of a closed cross-section formed by the first surface 11, the second surface 12, and the side surfaces 13 (hereinafter may simply be referred to as a closed cross-section), and to extend in a longitudinal direction of the frame body 1. The bead 15 is provided on at least part of the first surface 11 in the longitudinal direction of the frame body 1 (e.g., on the upper part of the center pillar, or the lower part of the center pillar to which an impact load tends to be applied upon side impact of the vehicle (particularly the part between upper and lower door mounting brackets 31 (see FIG. 15)). The bead 15 is not essential, and may be omitted. The bead 15 may protrude outward of the closed cross-section.

Each of the side surfaces 13 has a single bent part 14 (corresponding to a specific bent part) which is bent at a midpoint of the first surface 11 and the second surface 12 in the cross-section of the frame body 1. The bent part 14 is bent to protrude inward of the closed cross-section in the cross-section of the frame body 1. The first surface 11 and an outer part 13a of the side surface 13 which is positioned closer to the first surface 11 than the bent part 14 form an angle α of approximately 90 degrees or larger than 90 degrees inside the closed cross-section in the cross-section of the frame body 1. The range of approximately 90 degrees includes 90 degrees, and includes a normal margin of error from 90 degrees due to the press-forming. As long as the angle α is basically not smaller than 90 degrees, the first surface 11 and the two side surfaces 13 can easily be press-formed in one-piece.

In view of the press-forming of the reinforcement 4, corners formed by the first surface 11 and the outer parts 13a of the side surfaces 13 may be rounded in the cross-section of the frame body 1, and corners formed by the flange parts 4b and inner parts 13b of the side surfaces 13 positioned closer to the second surface 12 than the bent parts 14 may be rounded. The outer parts 13a and the inner parts 13b extend linearly in the cross-section of the frame body 1.

Each of the side surfaces 13 includes a low-strength part 17 closer to the second surface 12, and a high-strength part 18 closer to the first surface 11. A boundary portion between the low-strength part 17 and the high-strength part 18 of each of the side surfaces 13 is a strength transition part 19. The strength transition part 19 is located closer to the second surface 12 than the bent part 14.

In the present embodiment, the low-strength part 17 and the high-strength part 18 are different in thickness. The high-strength part 18 is thicker than the low-strength part 17 so that the high-strength part 18 has higher strength than the low-strength part 17. The reinforcement 4 is obtained by pressing a plate rolled to have two different thicknesses. A part of the reinforcement 4 including the first surface 11 may have the same thickness as the high-strength part 18 throughout the entire part thereof, but a center portion of the part of the reinforcement 4 including the first surface 11 in the width direction (where the bead 15 is formed) may have the same thickness as the low-strength part 17. A part of the reinforcement 4 including corners formed by the first surface 11, the outer parts 13a of the side surfaces 13, and parts of the first surface 11 near the corners preferably have the same thickness as the high-strength part 18 (in FIG. 1, the corners formed by the first surface 11 and the outer parts 13a of the side surfaces 13 and the parts of the first surface 11 near the corners are depicted to have the same thickness as the high-strength part 18). The flange parts 4b have the same thickness as the low-strength part 17.

Figure 2:
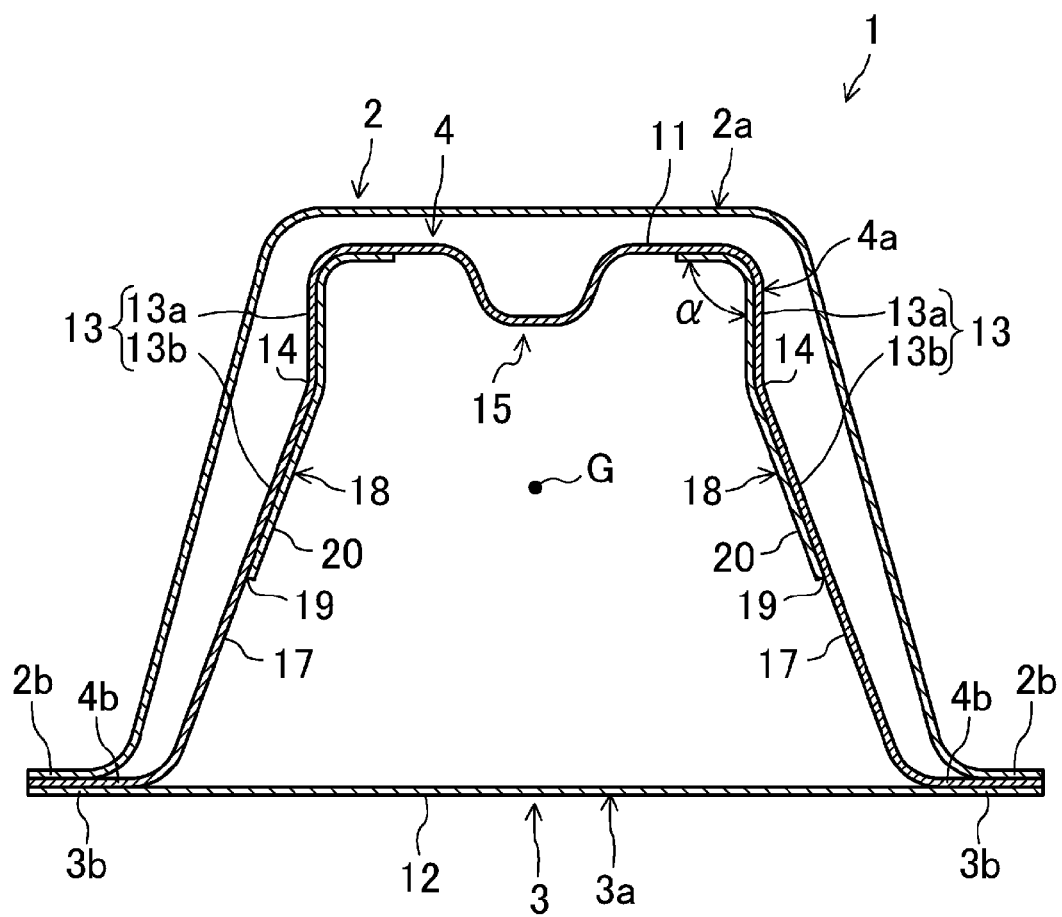
FIG. 2 is a view corresponding to FIG. 1 illustrating an alternative example of a low-strength part and a high-strength part.

In the present embodiment, the low-strength part 17 and the high-strength part 18 are provided by changing their thicknesses, but the low-strength part 17 and the high-strength part 18 are not limited thereto. For example, as shown in FIG. 2, a reinforcement member 20 may be bonded to part of a plate of a uniform thickness to form the high-strength part 18, and the other part to which the reinforcement member 20 is not bonded may be formed as the low-strength part 17. In FIG. 2, the reinforcement member 20 is welded to part of each side surface 13 to be the high-strength part 18, the corners formed by the first surface 11 and the outer parts 13a of the side surfaces 13, and the parts of the first surface 11 near the corners from the inside of the closed cross-section (or the outside of the closed cross-section). The reinforcement member 20 is welded to the plate before pressing the plate.

Figure 3:
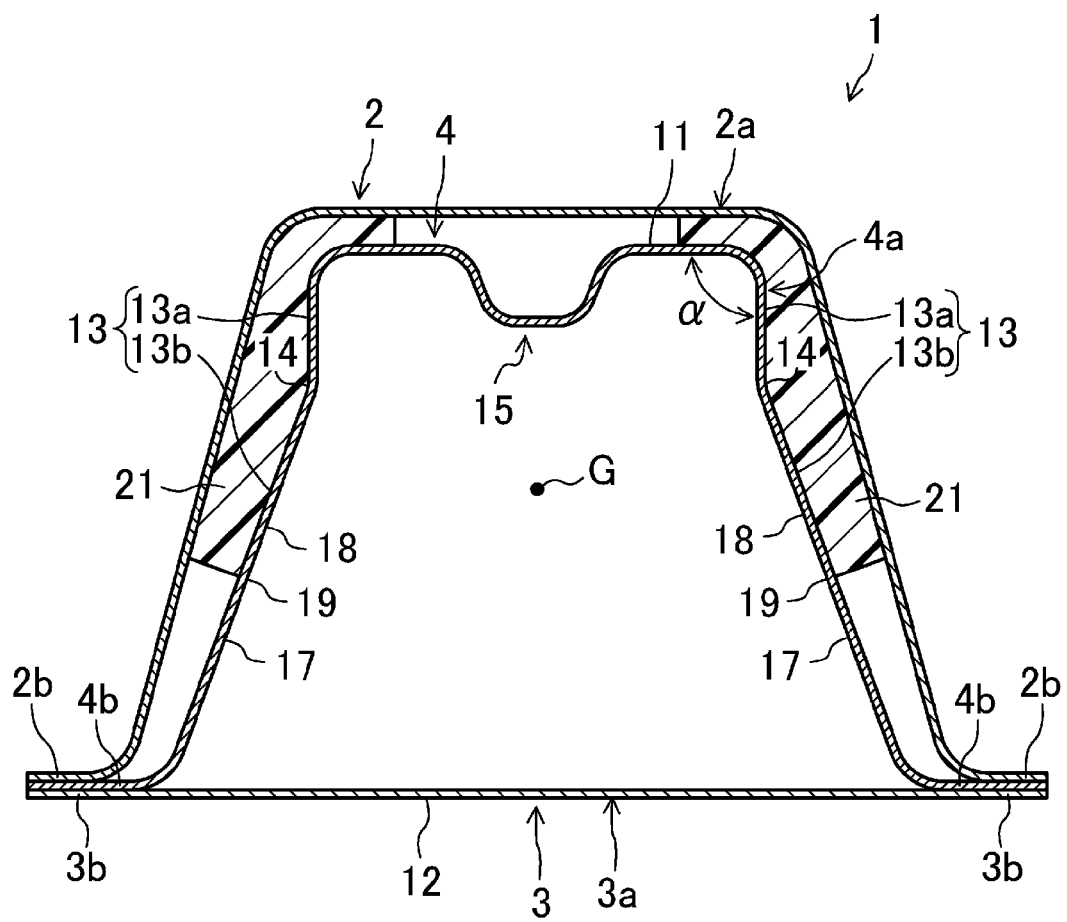
FIG. 3 is a view corresponding to FIG. 1 illustrating another alternative example of the low-strength part and the high-strength part.

Alternatively, as shown in FIG. 3, a filler 21 may be provided to fill a gap between the outer panel 2 and part of each side surface 13 to be the high-strength part 18, the corners formed by the first surface 11 and the outer parts 13a of the side surfaces 13, and the parts of the first surface 11 near the corners to form the high-strength part 18. Part of each side surface 13 corresponding to a gap which is not filled with the filler 21 may be formed as the low-strength part 17. The filler 21 may be a foaming agent which foams when heated. The foaming agent is sheet-shaped before foaming, and is adhered to part of the surface of the reinforcement facing outside of the closed cross-section to be covered with the filler 21. The sheet-shaped foaming agent foams in a drying step to fill the gap after the entire vehicle body is immersed in an electrodeposition solution.

Still alternatively, part of a plate of a uniform thickness to be the high-strength part 18 may be hardened to form the high-strength part 18, and the other part which is not hardened may be formed as the low-strength part 17.

Further alternatively, a plurality of through holes may be opened in part of a plate of a uniform thickness which is approximately the same as the thickness of the high-strength part 18 of the present embodiment to form so that the part provided with the through holes functions as the low-strength part 17, and part of the plate without the through holes functions as the high-strength part 18. The through holes may be used in assembling the frame body 1, or in mounting other parts to the frame body 1.

When side impact is caused on the vehicle, an externally applied load is exerted on a middle part of the first surface 11 in the longitudinal direction of the frame body 1 (an impact load is exerted to bend the frame body 1 so that a middle part of the frame body 1 in the longitudinal direction protrudes inward of the vehicle body relative to the ends of the frame body in the longitudinal direction) to bend the frame body 1, radii of curvature of the first surface 11 and the second surface 12 differ, and a difference is made between circumferences of the first surface 11 (compressed surface) and the second surface 12 (stretched surface). At this time, a force is exerted to reduce the difference in circumference, and the first surface 11 and the second surface 12 approach each other. When part of the first surface 11 on which the externally applied load is exerted is dented by the externally applied load, the first surface 11 and the second surface 12 approach each other. As a result, a force is exerted on an end of the side surface 13 closer to the first surface 11 around the part on which the externally applied load is exerted or a portion near the end in such a manner that the side surface 13 is bent outward of the closed cross-section using the flange part 4b as a fulcrum (a force is exerted in a direction outward of the closed cross-section), and the end or the portion may locally be buckled (the end or the portion locally bulges outward of the closed cross-section). When this local buckling occurs, flexural strength of the frame body 1 decreases.

In this embodiment, however, the bent part 14 protruding inward of the closed cross-section is provided on each of the side surfaces 13, and a force in a direction inward of the closed cross-section is exerted on the bent part 14 to cancel the force in the direction outward of the closed cross-section. Thus, even when a large externally applied load is exerted on the first surface 11, the local buckling does not easily occur at the end of the side surface 13 closer to the first surface 11 around the part on which the externally applied load is exerted. This can ensure the strength of the frame body 1 against flexure caused by the externally applied load, thereby improving side impact performance of the vehicle.

Further, since only part of each side surface 13 which is closer to the first surface 11 and includes the bent part 14 is formed as the high-strength part 18, the occurrence of the local buckling can effectively be reduced, and part of each side surface 13 closer to the second surface 12 can be reduced in weight. Thus, the frame body 1 can be reduced in weight, and flexural strength of the frame body 1 can be improved.

Moreover, the bead 15 is formed on the first surface 11. Thus, when the externally applied load is exerted on part of the first surface 11 provided with the bead 15, the part of the first surface 11 to which the external applied load is exerted is not easily deformed. Therefore, the local buckling is much less likely to occur at the end of the side surface 13 closer to the first surface 11 around the part on which the externally applied load is exerted.

The bent part 14 (the specific bent part) is preferably located closer to the first surface 11 than a center of gravity G (see FIG. 1) of the cross-section of the frame body 1 in a direction perpendicular to the first surface 11. The strength transition part 19 is preferably located closer to the second surface 12 than the center of gravity G in the direction perpendicular to the first surface 11.

With the bent part 14 located closer to the first surface 11 than the center of gravity G in the direction perpendicular to the first surface 11, the force exerted in a direction outward of the closed cross-section when the externally applied load is exerted on the first surface 11 is favorably canceled. That is, when the externally applied load is exerted on the first surface 11, a compressive force is applied to part of the frame body 1 closer to the first surface 11 than the center of gravity G, and a tensile force is applied to part of the frame body 1 closer to the second surface 12 than the center of gravity G. Since the force in the direction outward of the closed cross-section is exerted on the part to which the compressive force is applied, the bent part 14 for canceling the force is preferably located in the part to which the compressive force is applied. Thus, the force in the outward direction of the closed cross-section can favorably be canceled by locating the bent part 14 at a position where the compressive force is applied, i.e., located closer to the first surface 11 than the center of gravity G. With the strength transition part 19 located closer to the second surface 12 than the center of gravity G in the direction perpendicular to the first surface 11, the part to which the compressive force is applied can entirely be increased in strength so that the local buckling can effectively be reduced. Further, the first surface 11 approaches the second surface 12 immediately before the local buckling occurs, and the position of the center of gravity G slightly moves immediately before the local buckling occurs toward the second surface 12 from the initial position before the load is applied. Even if the center of gravity G is moved in this way, the part to which the compressive force is applied can entirely be increased in strength by the strength transition part 19 located closer to the second surface 12 than the center of gravity G at the initial position.

Figure 4:
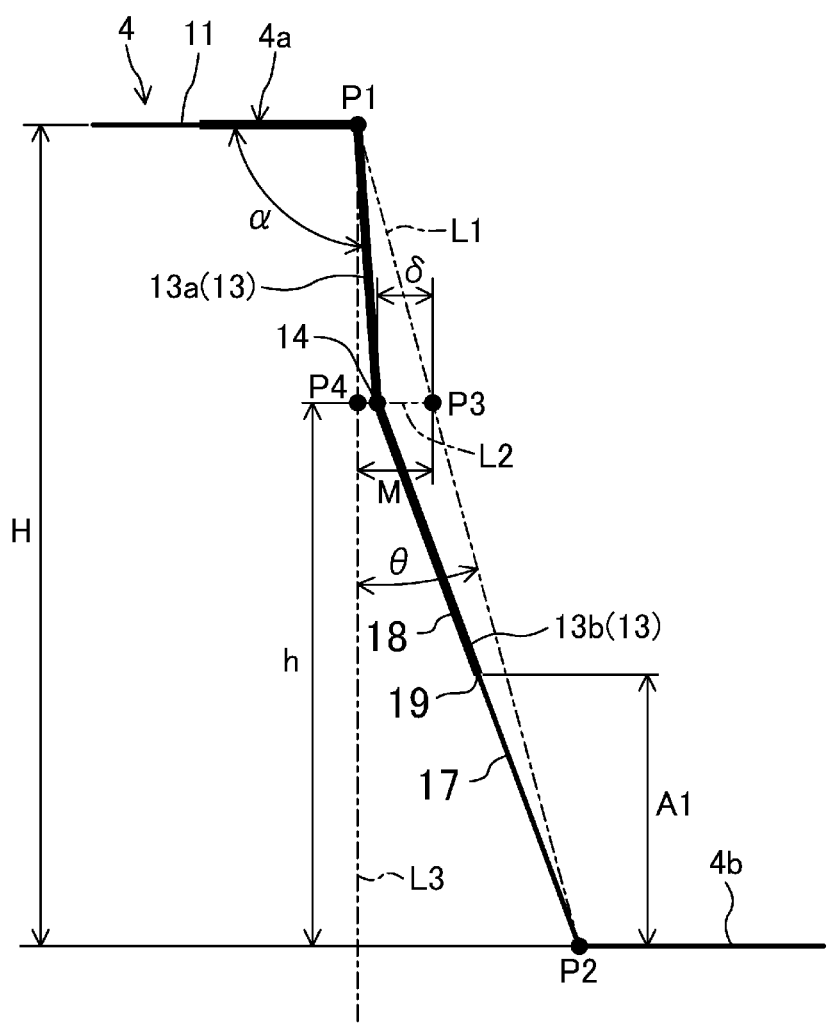
FIG. 4 is a schematic view of a cross-section of a major part of the frame body.

As shown in FIG. 4, in the cross-section of the frame body 1, a first virtual line L1 connecting an end P1 of the side surface 13 closer to the first surface 11 and an end P2 of the side surface 13 closer to the second surface 12 is positioned outside the closed cross-section. Specifically, the bent part 14 is positioned inside the first virtual line L1 relative to the closed cross-section. The first virtual line L1 corresponds to the side surface 13 on which the bent part 14 is not formed. As shown in FIG. 4, even when the corners formed by the first surface 11 and the outer parts 13a of the side surfaces 13 and the corners formed by the inner parts 13b and the flange parts 4b are rounded, the positions of the ends P1 and P2 are the same as the positions of the ends P1 and P2 when the corners are not rounded.

In the cross-section of the frame body 1, provided that a distance between the end P1 of the side surface 13 closer to the first surface 11 and the end P2 of the side surface 13 closer to the second surface 12 measured along a direction perpendicular to the first surface 11 is H, a distance between the bent part 14 and the end P2 of the side surface 13 closer to the second surface 12 measured along the direction perpendicular to the first surface 11 is h, a distance between the bend part 14 and a point of intersection P3 of the first virtual line L1 and a second virtual line L2 passing the bent part 14 and parallel to the first surface 11 is δ, and an acute angle formed by the first virtual line L1 and a line perpendicular to the first surface 11 (an acute angle formed by the first virtual line L1 and a third virtual line L3 passing the end P1 and perpendicular to the first surface 11) is θ, the inequality $$0.5 \leq \delta/(H-h)\tan\theta \leq 1.0 \quad (1)$$

is preferably satisfied.

More preferably, the inequality $$0.8 \leq \delta/(H-h)\tan\theta \leq 1.0 \quad (2)$$

is satisfied.

In the cross-section of the frame body 1, a distance between the point of intersection P3 and a point of intersection P4 of the second and third virtual lines L2 and L3 is $(H-h)\tan\theta$. Thus, value $\delta/(H-h)\tan\theta$ (=M) indicates how the bent part 14 is dented inward of the closed cross-section from P3 in the distance between P3 and P4. When M=0 (δ=0), the bent parts 14 are not formed on the side surfaces 13. When M>0, the bent part 14 protruding inward of the closed cross-section is provided on each of the side surfaces 13. When M=1.0, the bent part 14 is positioned at the point of intersection P4, i.e., the angle α is 90 degrees. Thus, when M≤1.0, the angle α is 90 degrees or larger. Therefore, the value M is preferably larger than 0 and not larger than 1.0. The inequality (1) (particularly the inequality (2)) is preferably satisfied to favorably improve the flexural strength of the frame body 1 as compared with the case where the bent parts 14 are not formed (see FIG. 6 and FIG. 7). In particular, when M=1.0, i.e., the angle α is approximately 90 degrees, the flexural strength of the frame body 1 is improved to a maximum degree (see FIG. 6 and FIG. 7).

In the cross-section of the frame body 1, provided that a distance between the first surface 11 (a linear part excluding the bead 15) and part of the second surface 12 farthest from the first surface 11 measured along the direction perpendicular to the first surface 11 is Ha (substantially equal to the distance H in this embodiment), and a distance between the bent part 14 (the specific bent part) and the part of the second surface 12 farthest from the first surface 11 measured along the direction perpendicular to the first surface 11 is ha (substantially equal to the distance h in this embodiment), the inequality $$0.55 \leq ha/Ha \leq 0.90 \quad (3)$$

is preferably satisfied.

More preferably, the inequality $$0.60 \leq ha/Ha \leq 0.85 \quad (4)$$

Specifically, the flexural strength of the frame body 1 varies depending on the position of the bent part 14 along the direction perpendicular to the first surface 11, and the flexural strength of the frame body 1 can favorably be improved when the inequality (3) (particularly the inequality (4)) is satisfied (see FIG. 8 and FIG. 9). The reason why the distances ha and Ha are measured from the part of the second surface 12 farthest from the first surface 11 is that it is considered to be suitable to use the part as a reference because a maximum tensile stress is applied to the part when the frame body 1 is bent by the externally applied load.

In the cross-section of the frame body 1, provided that an angle α formed by the first surface 11 and the outer part 13a inside the closed cross-section is approximately 90 degrees, a distance between the strength transition part 19 and the part of the second surface 12 farthest from the first surface 11 measured along the direction perpendicular to the first surface 11 is Aa (substantially equal to a distance A1 between the strength transition part 19 and the end P2 of the side surface 13 closer to the second surface 12 measured along the direction perpendicular to the first surface 11 in the present embodiment (see FIG. 4)), the inequality $$0.40 \leq Aa/ha \leq 0.66 \quad (5)$$

is preferably satisfied in addition to the inequality (3) (preferably the inequality (4)).

When the inequality (3) (preferably the inequality (4)) is satisfied, the flexural strength of the frame body 1 can favorably be improved. In addition, when the position of the strength transition part 19 is determined to satisfy $0.40 \leq Aa/ha \leq 0.66$, the flexural strength of the frame body 1 can further be improved.

When the angle α is approximately 90 degrees, the inequality $$0.40 \leq Aa/ha \leq 0.53 \quad (6)$$

may be satisfied in addition to the inequality (3) (preferably the inequality (4)).

In this case, the strength transition part 19 can easily be located closer to the second surface 12 than the center of gravity G in the direction perpendicular to the first surface 11, and the flexural strength of the frame body 1 can favorably be improved.

To examine advantages of providing each of the side surfaces 13 with the bent part 14, a three-point flexure test was performed on test frame bodies A and B in which each of the side surfaces 13 is provided with the bent part 14, and a test frame body C in which the bent part 14 is not provided. In the test frame bodies A-C, each of the side surfaces 13 is not provided with the strength transition part 19.

The test frame body A is the same as the test frame body shown in FIG. 6 in which M=1.00, and has the bent parts 14 formed on the side surfaces 13, but does not have the bead 15 formed on the first surface 11. The test frame body B is provided by forming the bead 15 on the substantial center of the first surface 11 of the test frame body A in the width direction of the first surface 11 to extend in the longitudinal direction of the test frame body throughout the length of the first surface 11. The bead 15 protrudes inward of the closed cross-section. The test frame body C is the same as the test frame body shown in FIG. 6 in which M=0, and does not have the bent parts 14 formed on the side surfaces 13 (see the closed cross-sections of the test frame bodies A-C shown in FIG. 10). Each of the test frame bodies A-C constitutes the center pillar like the frame body 1, but is not provided with the outer panel 2 (the same is applied to the other test frame bodies described later).

Figure 5:
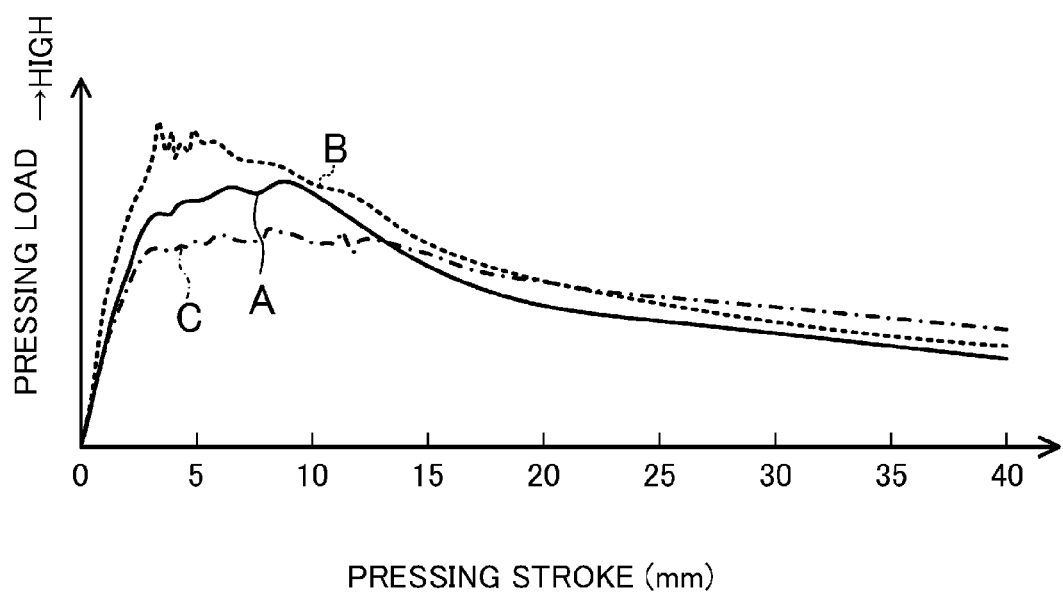
FIG. 5 is a graph showing a relationship between pressing stroke and pressing load on test frame bodies A-C.

On each of the test frame bodies A-C, an indenter in the shape of a cylindrical column extending in the width direction of the first surface 11 is pressed onto a middle part of the first surface 11 in the longitudinal direction with both ends of the second surface 12 fixed to examine a relationship between a pressing stroke of the indenter and a pressing load (a bending load) as the externally applied load. FIG. 5 shows the results.

It is considered that the local buckling occurs when the pressing load is the maximum, and the pressing load does not increase from the maximum value. Specifically, the larger the maximum value of the pressing load (Fmax) is, the higher the flexural strength of the test frame body is. The test frame bodies A and B in which the bent parts 14 are formed on the side surfaces 13 are improved in flexural strength as compared with the test frame body C in which the bent parts 14 are not formed. The test frame body B in which the bead 15 is formed on the first surface 11 is further improved in flexural strength.

Then, the three-point flexure test is performed on various test frame bodies having different values δ (i.e., value M), and a rate of improvement of a value obtained by dividing the maximum value of the pressing load Fmax with a mass of the frame body (hereinafter referred to as Fmax mass efficiency). The rate of improvement in Fmax mass efficiency is evaluated with reference to the Fmax mass efficiency obtained when the bend parts 14 are not formed on the side surfaces 13 (δ=0, i.e., M=0). In this case, h/H (substantially equal to ha/Ha in this embodiment) is fixed to 0.75. Positions of P1 and P2 and the value of the angle θ of the first virtual line L1 are also fixed. The value δ (the value M) obtained when the bent part 14 is positioned inside the first virtual line L1 relative to the closed cross-section is regarded as positive, and the value δ obtained when the bent parts 14 are positioned outside the first virtual line L1 relative to the closed cross-section is regarded as negative. Specifically, when the value δ (M) is negative, the bent parts 14 are bent to protrude outward of the closed cross-section. When the value M exceeds 1, the bent parts 14 are positioned inside the third virtual line L3 relative to the closed cross-section (the angle α is smaller than 90 degrees). The mass of the test frame body does not significantly vary even when the value δ is changed. Thus, the rate of improvement in Fmax mass efficiency is substantially the same as the rate of improvement in Fmax with reference to Fmax obtained when the bent parts 14 are not formed on the side surfaces 13. However, the rate of improvement in Fmax mass efficiency is strictly obtained in view of weight reduction.

Figure 7:
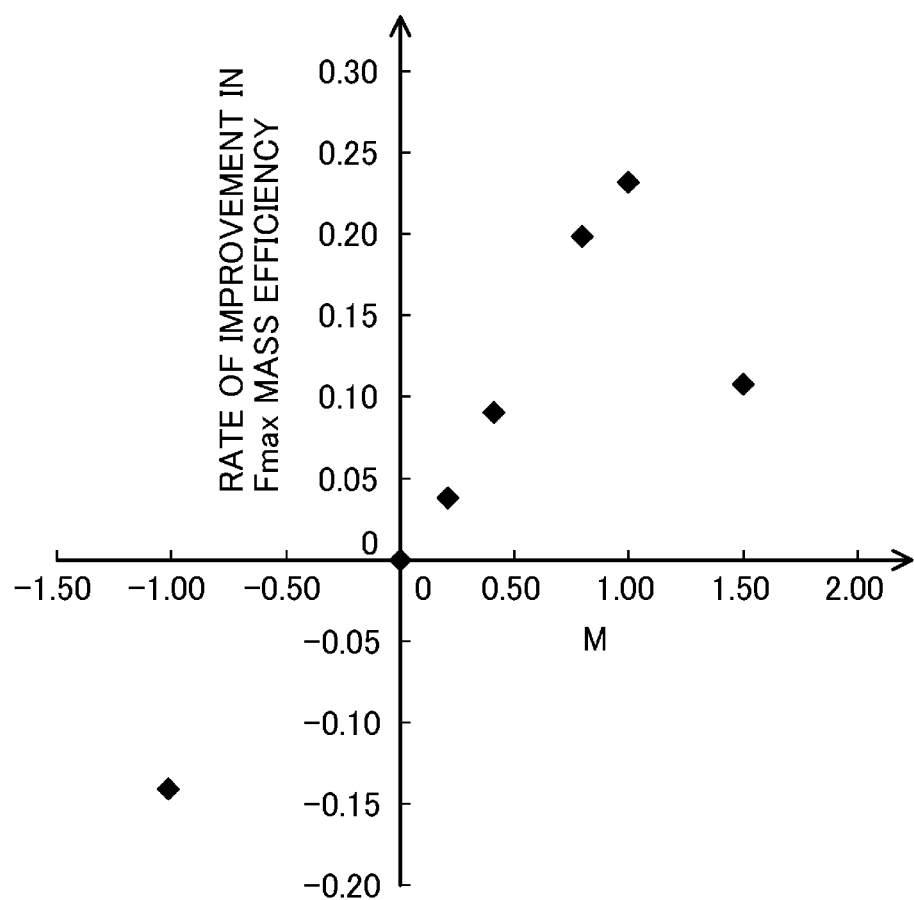
FIG. 7 is a graph showing a relationship between the value M and the rate of improvement in Fmax mass efficiency.

FIGS. 6 and 7 show the relationship between the value M and the rate of improvement in Fmax mass efficiency. FIG. 6 also shows the shape of the closed cross-section corresponding to the value M.

As shown in FIG. 7, the Fmax mass efficiency is improved when the value M exceeds 0 (when the bent parts 14 are bent to protrude inward of the closed cross-section), and the Fmax mass efficiency is favorably improved when the value M is 0.5 to 1.0, both inclusive, particularly 0.8 to 1.0, both inclusive. In particular, when M=1.0, i.e., the angle α is approximately 90 degrees, the rate of improvement in Fmax mass efficiency is maximized.

Then, the three-point flexure test is performed on various test frame bodies having different values h/H (can be regarded as the same as the values ha/Ha) to obtain the rate of improvement in Fmax mass efficiency. The rate of improvement in Fmax mass efficiency is evaluated with reference to the Fmax mass efficiency obtained when the bent parts 14 are not formed on the side surfaces 13 (h/H=1.0). The value M is fixed to 1.00 (α=90 degrees). The positions of P1 and P2 and the value of the angle θ of the first virtual line L1 are also fixed. The test frame body shown in FIG. 8 in which h/H=1.00 is the same as the test frame body shown in FIG. 6 in which M=0 (the test frame body in which the bent parts 14 are not formed on the side surfaces 13). It can be said that the value h/H of this test frame body is 0. The test frame body shown in FIG. 8 in which h/H=0.75 is the same as the test frame body shown in FIG. 6 in which M=1.00.

FIGS. 8 and 9 show the relationship between the value h/H and the rate of improvement in Fmax mass efficiency. FIG. 8 also shows the shape of the closed cross-section corresponding to the value h/H.

As shown in FIG. 9, the Fmax mass efficiency is improved when the value h/H is larger than 0 and smaller than 1.00, and the Fmax mass efficiency is favorably improved when the value h/H is 0.55 to 0.90, both inclusive, particularly 0.60 to 0.85, both inclusive. Specifically, the force exerted in the direction outward of the closed cross-section on the end of the side surface 13 closer to the first surface 11 or a part of the side surface 13 near the end can favorably be canceled by suitably determining the positions of the bent parts 14 along the direction perpendicular to the first surface 11.

Subsequently, the rates of improvement in Fmax mass efficiency of the test frame bodies A-C used in the first three-point flexure test (the rate of improvement with reference to the rate of improvement of the test frame body C in which the bent parts 14 are not formed on the side surfaces 13) are obtained. FIG. 10 shows the results. The results and FIG. 5 show the effect of providing the bead 15 on the first surface 11.

In each of the test frame bodies used in the tests, each of the side surfaces 13 is not provided with the strength transition part 19.

Then, the three-point flexure test is performed on test frame bodies each including the strength transition part 19 formed in each of the side surfaces 13. In this test, the test frame bodies having the closed cross-section of the same shape as the closed cross-section of the test frame body used to examine the relationship between the value h/H and the rate of improvement in Fmax mass efficiency are used, and each of the side surfaces 13 is provided with the strength transition part 19. That is, the low-strength part 17 and the high-strength part 18 having different thicknesses are provided. The low-strength part 17 is 1 mm in thickness, and the high-strength part 18 is 2 mm in thickness. A part of the reinforcement 4 including the first surface 11 has the same thickness as the high-strength part 18, and the flange parts 4b have the same thickness as the low-strength part 17. The first surface 11 is provided with the bead 15. Except for the above-described features, the test frame bodies are the same as the test frame body used to examine the relationship between the value h/H and the rate of improvement in Fmax mass efficiency.

Then, the three-point flexure test is performed on test frame bodies in which the values h/H (substantially equal to the value ha/Ha) are 0.55, 0.75, and 0.90, respectively, and the strength transition parts 19 (the value A1/h) are provided at different positions to obtain the rate of improvement in Fmax mass efficiency. The value A1 is a distance between the strength transition part 19 and the end P2 of the side surface 13 closer to the second surface 12 measured along the direction perpendicular to the first surface 11 (see FIG. 4). The rate of improvement in Fmax mass efficiency is a rate of improvement with reference to the Fmax mass efficiency obtained when the strength transition parts 19 are not formed on the side surfaces 13 (A1=0). Every test frame body has the same value H (Ha), i.e., 76.5 mm.

Figure 11:
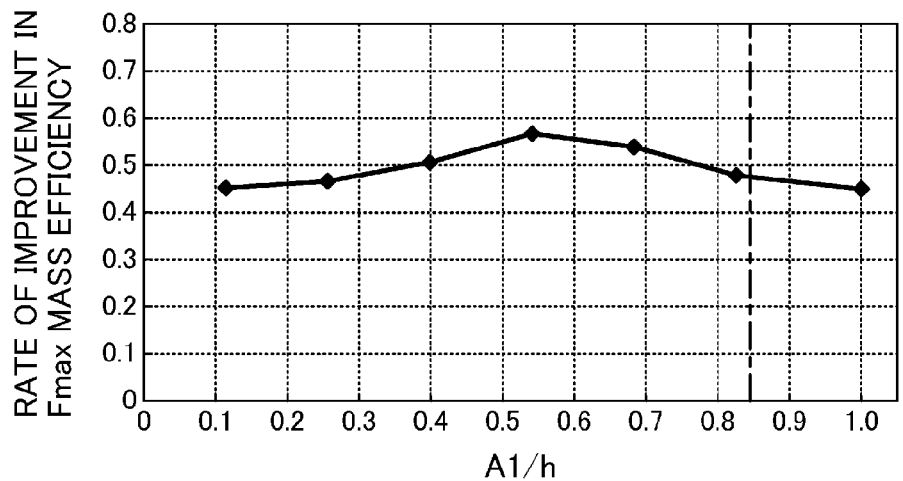
FIG. 11 is a graph showing a relationship between value A1/h and rate of improvement in Fmax mass efficiency in a test frame body in which a strength transition part is formed in the side surface, and the value h/H is 0.55.
Figure 12:
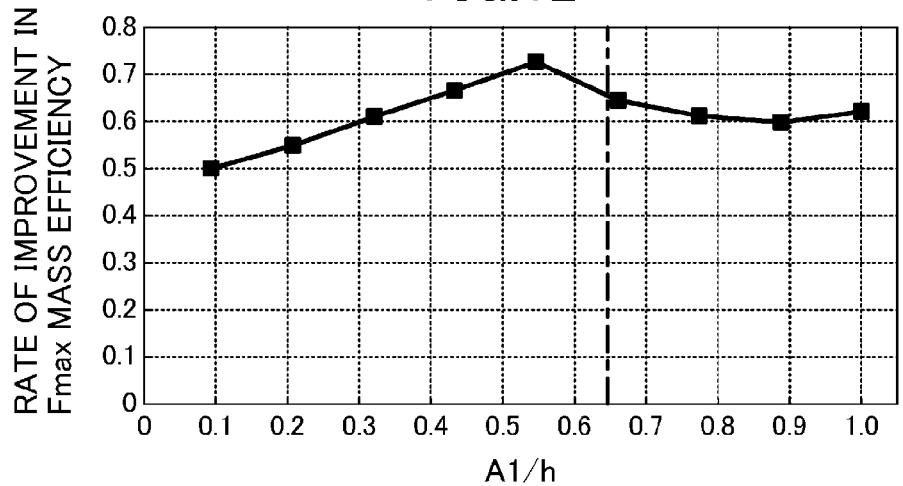
FIG. 12 is a graph showing a relationship between the value A1/h and the rate of improvement in Fmax mass efficiency in a test frame body in which a strength transition part is formed in the side surface, and the value h/H is 0.75.
Figure 13:
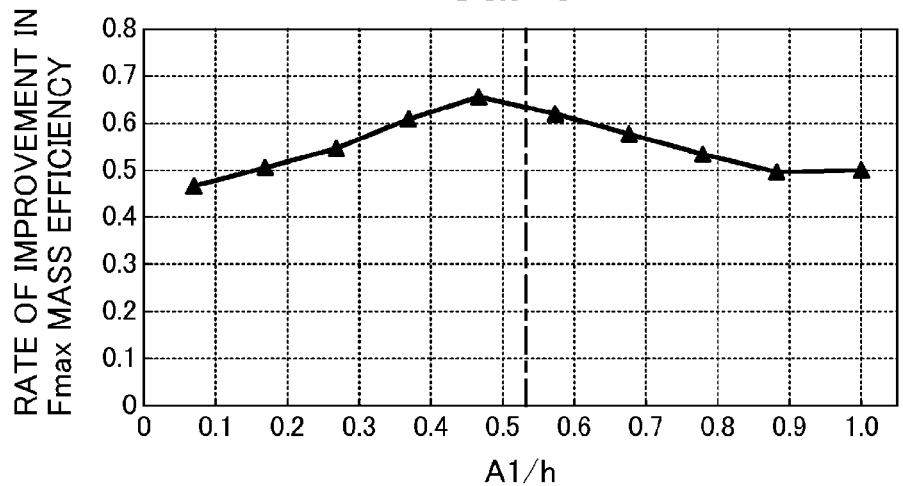
FIG. 13 is a graph illustrating a relationship between the value A1/h and the rate of improvement in Fmax mass efficiency in a test frame body in which a strength transition part is formed in the side surface, and the value h/H is 0.90.

FIG. 11 shows a relationship between the value A1/h (substantially equal to the value Aa/ha) and the rate of improvement in Fmax mass efficiency when the h/H is 0.55. FIG. 12 shows a relationship between the value A1/h (Aa/ha) and the rate of improvement in Fmax mass efficiency when the value h/H is 0.75. FIG. 13 shows a relationship between the value A1/h (Aa/ha) and the rate of improvement in Fmax mass efficiency when the value h/H is 0.90. In graphs of FIGS. 11-13, the value A1/h at a dot-and-dash line is a value corresponding to the position of the center of gravity of the cross-section of each test frame body. When the value A1/h is smaller than the value corresponding to the position of the center of gravity, the strength transition part 19 is located closer to the second surface 12 than the center of gravity in the direction perpendicular to the first surface 11.

As seen in FIG. 11-FIG. 13, when the value A1/h is 0.40 or higher and 0.53 or lower, the value A1/h is smaller than the value corresponding to the position of the center of the gravity, and the rate of improvement in Fmax mass efficiency can favorably be increased.

When the value A1/h is 0.40 or higher and 0.66 or lower, the strength transition part 19 maybe located closer to the first surface 11 than the center of gravity in the direction perpendicular to the first surface 11, but the rate of improvement in Fmax mass efficiency can be maintained at a high level.

When the value A1/h (Aa/ha) is too small (when the strength transition part 19 approaches the second surface 12 too much), the flexural strength of the test frame body improves, but the weight of the test frame body increases. When the value A1/h (Aa/ha) increases too much (the strength transition part 19 approaches the bent part 14 too much), the test frame body is reduced in weight, but the flexural strength of the test frame body decreases. Thus, to reduce the weight of the frame body 1, and to increase the flexural strength of the frame body 1, the position of the strength transition part 19 may be in a preferable range, and the inequality (5) or the inequality (6) may be satisfied.

In the above-described embodiment, only a single bent part 14 is provided on each of the side surfaces 13. However, two or more bent parts 14 may be provided on each of the side surfaces 13. In such a case, part of each of the side surfaces 13 closer to the first surface 11 than one of the bent parts 14 closest to the first surface 11 is regarded as the outer part 13a. Then, the first surface 11 and the outer part 13a form an angle of approximately 90 degrees or larger than 90 degrees inside the closed cross-section, and one of the bent parts 14 on each of the side surfaces 13 closest to the second surface 12 (corresponding to the specific bent part) is bent to protrude inward of the closed cross-section in the cross-section of the frame body 1. The other bent parts 14 may protrude outward or inward of the closed cross-section. Specifically, the bent part 14 protruding outward of the closed cross-section is present between the end of the side surface 13 closer to the first surface 11 and one of the bent parts 14 closest to the second surface 12 (the specific bent part). Thus, even when the force is exerted in the direction outward of the closed cross-section on the end of the side surface 13 closer to the first surface 11 or the portion near the end, and the force is exerted in the direction outward of the closed cross-section on the bent part 14 protruding outward of the closed cross-section, these forces can be canceled by the force exerted in the direction inward of the closed cross-section on the bent part 14 closest to the second surface 12 (the specific bent part).

When the two or more bent parts 14 are provided on each of the side surfaces 13, like in the case where the single bent part 14 is provided, each of the side surfaces 13 includes the low-strength part 17 closer to the second surface 12 and the high-strength part 18 closer to the first surface 11, and the strength transition part 19 which is a boundary between the low-strength part 17 and the high-strength part 18 of each of the side surfaces 13 may be located closer to the second surface 12 than the specific bent part.

The specific bent part is preferably located closer to the first surface 11 than the center of gravity G of the cross-section of the frame body 1 in the direction perpendicular to the first surface 11, and the strength transition part 19 is preferably located closer to the second surface 12 than the center of gravity G in the direction perpendicular to the first surface 11.

Further, the inequality (3) (in particular the inequality (4)) is preferably satisfied. In this case, ha is a distance between the specific bent part and part of the second surface 12 farthest from the first surface 11 measured along the direction perpendicular to the first surface 11.

The three-point flexure test is performed on test frame bodies D-F in which two bent parts 14 are formed on each of the side surfaces 13 to obtain the rates of improvement in Fmax mass efficiency of the test frame bodies D and E with reference to the Fmax mass efficiency of the test frame body F. In the test frame bodies D-F, each of the side surfaces 13 does not include the strength transition part 19.

In the test frame body D, the upper bent part 14 (closer to the first surface 11) is bent to protrude inward of the closed cross-section, and the lower bent part 14 (closer to the second surface) is also bent to protrude inward of the closed cross-section. In the test frame body E, the upper bent part 14 is bent to protrude outward of the closed cross-section, and the lower bent part 14 is bent to protrude inward of the closed cross-section. In the test frame body F, the upper bent part 14 is bent to protrude inward of the closed cross-section, and the lower bent part 14 is bent to protrude outward of the closed cross-section. The shapes of the cross-sections of the test frame bodies D-F are the same as the shape of the cross-section of the above-described test frame body in which the single bent part 14 is formed except for the shape of the side surfaces 13.

On each of the upper and lower bent parts 14 of the test frame bodies D-F, the values M and h/H are obtained in the same manner as the case where the single bent part 14 is formed. In this case, the first virtual line L1 is the same as the first virtual line L1 obtained in the case where the single bent part 14 is formed. FIG. 14 shows the results and the shape of the closed cross-section (the bent parts 14 are indicated by black dots in the closed cross-section). FIG. 14 also shows the rate of improvement in Fmax mass efficiency of the test frame bodies D and E (with reference to the Fmax mass efficiency of the test frame body F).

The results indicate that the test frame bodies D and E in which at least the lower bent part 14 protrudes inward of the closed cross-section show the greater improvement in Fmax mass efficiency than the test frame body F in which the lower bent part 14 protrudes outward of the closed cross-section.

When the two or more bent parts 14 are provided on each of the side surfaces 13, like in the case where the single bent part 14 is provided, part of each side surface 13 which includes the specific bent part and is closer to the first surface 11 is formed as the high-strength part by locating the strength transition part 19 closer to the second surface 12 than one of the bent parts 14 closest to the second surface (the specific bent part). This can effectively reduce the occurrence of the local buckling, and the part of each side surface 13 closer to the second surface 12 can be reduced in weight.

In the above-described embodiment, each of the two side surfaces 13 includes the low-strength part 17 and the high-strength part 18 (includes the strength transition part 19). However, one of the side surfaces 13 (one of the side surfaces 13 which particularly requires the strength) may include the strength transition part 19, and the other side surface 13 may not include the strength transition part 19. In this case, for weight reduction, the entire part of the other side surface 13 is preferably formed as the low-strength part 17 in the same manner as the low-strength part 17 of the one of the side surfaces 13 (e.g., the thickness of the other side surface 13 is the same as the thickness of the low-strength part 17 of the one of the side surfaces 13).

Figure 15:
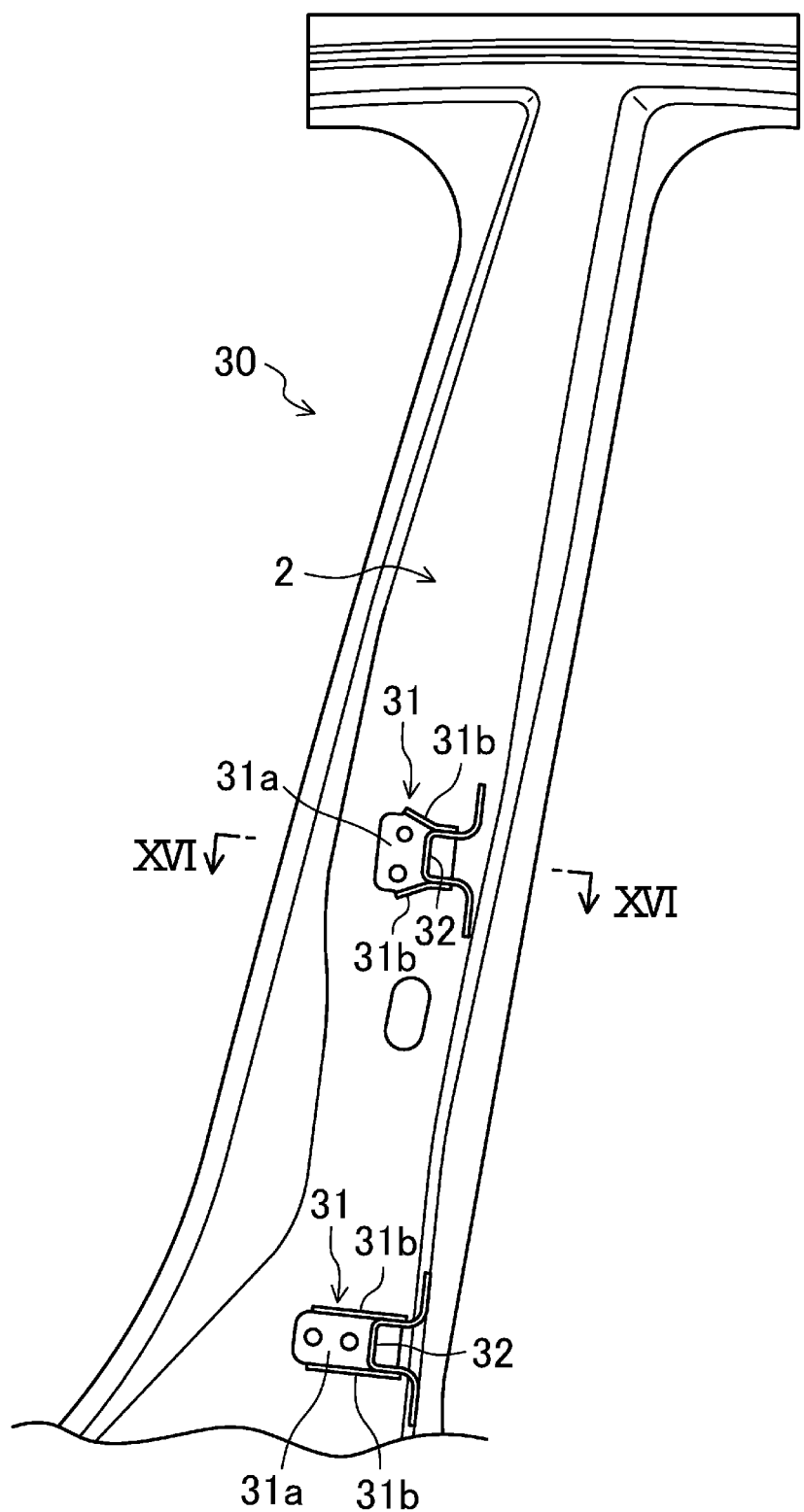
FIG. 15 is a view illustrating a major part of a center pillar observed from outside in a width direction of a vehicle.
Figure 16:
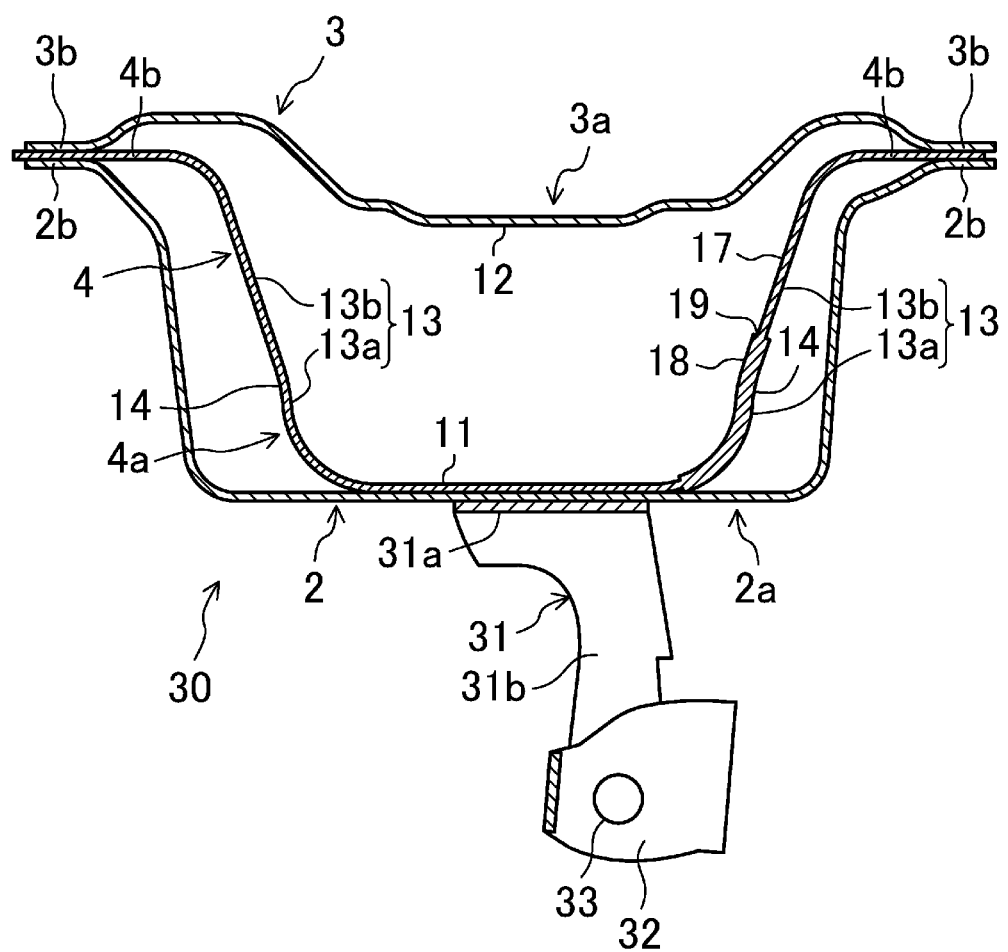
FIG. 16 is a cross-sectional view taken along the line XVI-XVI in FIG. 15.

As shown in FIG. 15 and FIG. 16, door mounting brackets 31 for mounting a rear door which is not shown are attached to the first surface 11 of a center pillar 30 (the frame body) facing outside the vehicle through the outer panel 2. One of the door mounting brackets 31 is located slightly below a center of the center pillar 30 in the vertical direction, and the other door mounting bracket 31 is located at a lower part of the center pillar 30 in the vertical direction. Each of the door mounting brackets 31 includes a base 31a, and protrusions 31b protruding outwardly in a width direction of the vehicle from upper and lower ends of the base 31. The base 31a is fixed to the first surface 11 through the outer panel 2 with bolts and nuts which are not shown. Part of the first surface 11 in the vertical direction where the door mounting brackets 31 are attached is in contact with the outer panel 2 (see FIG. 16).

A rear end of the base 31a in a longitudinal direction of the vehicle is located near the side surface 13 located rearward in the longitudinal direction of the vehicle (the right side surface in FIGS. 15 and 16). Each of the protrusions 31b extends in the width direction of the vehicle near the rearward side surface 13. In the example shown in FIGS. 15 and 16, an end of each protrusion 31b closer to the base 31a extends forward in the longitudinal direction of the vehicle to be connected to a rear part and a front part of the upper or lower end of the base 31a. The end of each protrusion 31b may be connected at least to the rear part of the upper or lower end of the base 31a.

A rotating member 32 arranged between the two protrusions 31b is mounted on tip ends of the two protrusions 31b to be rotatable about a shaft 33 extending in the vertical direction. The rotating member 32 is fixed to the rear door, thereby mounting the rear door on the center pillar 30 through the door mounting brackets 31 to be rotatable about the shaft 33.

One of the two side surfaces 13 located rearward in the longitudinal direction of the vehicle includes the strength transition part 19, and the other side surface 13 located forward in the longitudinal direction of the vehicle does not include the strength transition part 19. That is, the rearward side surface 13 includes the low-strength part 17 closer to the second surface 12 and the high-strength part 18 closer to the first surface 11, and the high-strength part 18 is thicker than the low-strength part 17. A part of the reinforcement 4 including the first surface 11 and the forward side surface 13 has the same thickness as the low-strength part 17 of the rearward side surface 13.

In this configuration, when the externally applied load is input to the center pillar 30 through the rear door and the door mounting brackets, the protrusions 31b of the door mounting brackets 31 are bent rearward in the longitudinal direction of the vehicle around their ends closer to the base 31a. At this time, the externally applied load is input to part of the first surface 11 located rearward in the longitudinal direction of the vehicle. Thus, the local buckling may easily occur at the one of the two side surfaces 13 located rearward in the longitudinal direction of the vehicle. Therefore, part of the side surface 13 located rearward in the longitudinal direction of the vehicle which is closer to the first surface 11 and includes the specific bent part may be increased in strength. Since the specific bent part is provided on the side surface 13 located forward in the longitudinal direction of the vehicle, the force in the outward direction of the closed cross-section can be canceled solely by the specific bent part, and the occurrence of the local buckling can sufficiently be reduced. As a result, the center pillar 30 can further be reduced in weight.

The present disclosure is not limited to the above-described embodiment, and may be modified within the scope of claims.

For example, the vehicle frame structure of the present disclosure applied to the inner panel 3 and the reinforcement 4 in the above-described embodiment may be applied to the outer panel 2 and the inner panel 3. In this case, the first surface 11 and the side surfaces 13 may be constituted of the body 2a of the outer panel 2, and the reinforcement 4 may be omitted.

The vehicle frame structure of the present disclosure may be applied to other parts than the center pillar, e.g., a bumper reinforcement, a front side frame (especially a kick-up part), a side sill extending in the longitudinal direction of the vehicle at each side of a floor panel in the width direction of the vehicle, a roof rail extending in the longitudinal direction of the vehicle at each side of a roof panel in the width direction of the vehicle, a roof cross member provided on the roof rail to extend in the width direction of the vehicle, a front pillar, a rear side frame, a floor cross member provided on the floor panel to extend in the width direction of the vehicle, etc.

The above-described embodiment is merely illustrative, and should not be construed as limiting the scope of the present disclosure. The scope of the present disclosure is defined by the appended claims, and all changes which come within the meaning and range of equivalency of the claims are intended to be embraced in the scope of the present disclosure.

INDUSTRIAL APPLICABILITY

The present disclosure is useful for a vehicle frame structure having a frame body constituting a vehicle body, particularly for a vehicle frame structure having a frame body constituting a center pillar of the vehicle body.

DESCRIPTION OF REFERENCE CHARACTERS

1 Frame body
2 Outer panel
3 Inner panel
4 Reinforcement
11 First surface
12 Second surface
13 Side surface
14 Bent part (specific bent part)
17 Low-strength part
18 High-strength part
19 Strength transition part
30 Center pillar
31 Door mounting bracket
31a Base
31b Protrusion

The invention claimed is:

1. A vehicle frame structure, comprising:
a frame body constituting a vehicle body, wherein
the frame body includes a first surface facing outside of the vehicle body, a second surface which is positioned inside the first surface to oppose the first surface and is wider than the first surface, and two side surfaces, one of which connecting one of ends of the first surface in a width direction of the first surface and one of ends of the second surface in a width direction of the second surface, the other connecting the other end of the first surface and the other end of the second surface to form a closed cross-section together with the first surface and the second surface,
each of the side surfaces has a single bent part or two or more bent parts which are bent at a midpoint of the first surface and the second surface in a cross-section of the frame body,
the first surface and an outer part of the side surface which is positioned closer to the first surface than the single bent part, or is positioned closer to the first surface than one of the bent parts closest to the first surface form an angle of approximately 90 degrees or larger than 90 degrees inside the closed cross-section in the cross-section of the frame body,
a specific bent part which is the single bent part, or one of the bent parts closest to the second surface is bent to protrude inward of the closed cross-section,
at least one of the side surfaces includes a low-strength part closer to the second surface and a high-strength part closer to the first surface, and
a strength transition part as a boundary between the low-strength part and the high-strength part of the at least one of the side surfaces is located closer to the second surface than the specific bent part,
the frame body constitutes a center pillar of the vehicle body,
a door mounting bracket is mounted on the first surface of the frame body facing outside the vehicle body,
the door mounting bracket includes a base which is mounted and fixed to the first surface of the frame body facing outside the vehicle body, and a protrusion which protrudes from the base outwardly in a width direction of the vehicle, and has an end to which a door is mounted,
the protrusion extends in the width direction of the vehicle near one of the side surfaces located rearward in a longitudinal direction of the vehicle, and
only the one of the two side surfaces of the frame body located rearward in the longitudinal direction of the vehicle includes the low-strength part and the high-strength part, and the strength transition part is located closer to the second surface than the specific bent part in the side surface located rearward in the longitudinal direction of the vehicle.

2. The vehicle frame structure of claim 1, wherein
the specific bent part is located closer to the first surface than a center of gravity of the cross-section of the frame body in a direction perpendicular to the first surface, and
the strength transition part is located closer to the second surface than the center of gravity in the direction perpendicular to the first surface.

3. The vehicle frame structure of claim 2, wherein
each of the side surfaces has the single bent part,
the first surface and the outer part form an angle of approximately 90 degrees inside the closed cross-section in the cross-section of the frame body, and
provided that a distance between the first surface and part of the second surface farthest from the first surface measured along the direction perpendicular to the first surface is Ha, a distance between the specific bent part and the part of the second surface farthest from the first surface measured along the direction perpendicular to the first surface is ha, and a distance between the strength transition part and the part of the second surface farthest from the first surface measured along the direction perpendicular to the first surface is Aa in the cross-section of the frame body, $$0.55 \leq ha/Ha \leq 0.90 \text{ and}$$

$$0.40 \leq Aa/ha \leq 0.53$$

are satisfied.

4. The vehicle frame structure of claim 1, wherein
each of the side surfaces has the single bent part,
the first surface and the outer part form an angle of approximately 90 degrees inside the closed cross-section in the cross-section of the frame body, and provided that a distance between the first surface and part of the second surface farthest from the first surface measured along a direction perpendicular to the first surface is Ha, a distance between the specific bent part and the part of the second surface farthest from the first surface measured along the direction perpendicular to the first surface is ha, and a distance between the strength transition part and the part of the second surface farthest from the first surface measured along the direction perpendicular to the first surface is Aa in the cross-section of the frame body, $0.55 \leq ha/Ha \leq 0.90$ and $0.40 \leq Aa/ha \leq 0.66$ are satisfied.

* * * * *